(No Model.)
E. WHITTUM.
THREAD GUIDE SUPPORT FOR SPINNING MACHINES.
No. 600,341. Patented Mar. 8, 1898.
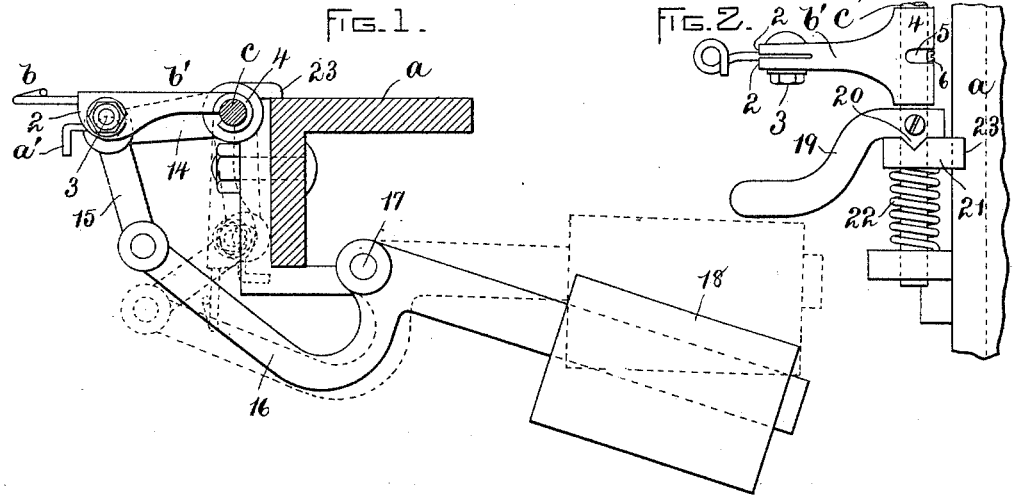
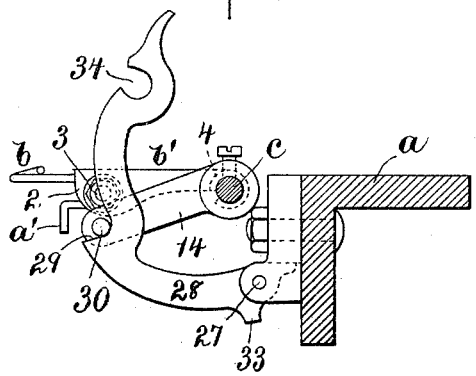
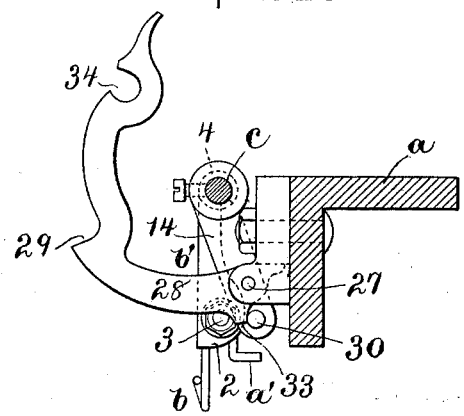
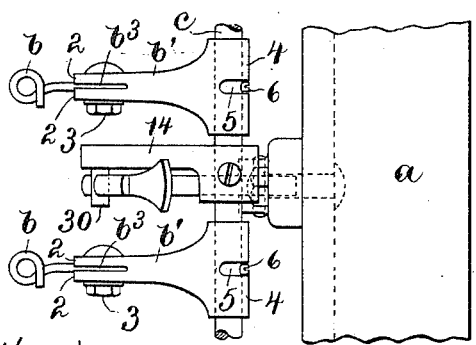
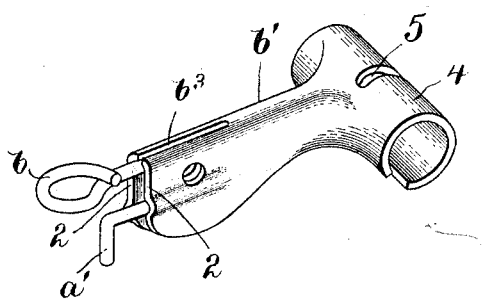
WITNESSES:
H. L. Robbins
H. Brown
INVENTOR:
Edward Whittum
by Wright Brown & Quinby
Attys

UNITED STATES PATENT OFFICE.

JOSEPH WILLIG, OF MULHOUSE, GERMANY.

PNEUMATIC TIRE.

SPECIFICATION forming part of Letters Patent No. 600,342, dated March 8, 1898.

Application filed July 14, 1897. Serial No. 644,488. (No model.)

*To all whom it may concern:*

Be it known that I, JOSEPH WILLIG, a subject of the Emperor of Germany, residing at 23 Rue de la Fidélité, Mulhouse, Alsace, in the German Empire, have invented new and useful Improvements in Pneumatic Tires, of which the following is a clear and complete specification.

This invention relates to a protective covering for the inner or air tubes of pneumatic tires, the said covering being designed to prevent the air-tube of a tire from being punctured by nails or the like without, however, lessening the elasticity of the tire.

To enable my invention to be fully understood, I have illustrated in the accompanying drawings as examples two forms of protective covering made according to my invention.

In the said drawings, Figure 1 is a cross-section of a pneumatic tire provided with my protective covering. Fig. 2 is a cross-section of the protective covering, and Fig. 3 is a plan of a portion of the same. Fig. 4 is a section showing the protective covering secured to the outer rubber covering of the tire. Fig. 5 is a cross-section of a modified form of my protective covering.

In Fig. 1, A is the outer india-rubber covering of the tire, B the india-rubber inner or air chamber, and C my protective covering, the said covering being arranged between the outer covering A and the air-tube B.

D is the rim to which the pneumatic tire is fitted.

The protective covering C consists of two layers of leather formed of a strip of leather, the lateral portions or edges $c'$ of which have been bent back upon the central portion $c$, so as to be connected together by their beveled or chamfered ends $c^2$. Steel wires E are inserted between the two layers of leather at the edges of the folded leather band thus formed, the said steel wires serving to secure the tire to the rim D and a metal strip F. For instance, a thin strip of ordinary steel or of aluminium-steel is placed between the two layers of leather in the center of the folded band. The surfaces of the two layers of leather which are in contact with one another are cemented together by means of india-rubber applied as a solution. The wires E, as also the metal strip F, are secured to the layers of leather by means of a rubber solution, and the said wires E, with the strip F, are held in position by threads $g\ g'$, which lace or sew the two layers of leather together. As shown in Fig. 4, the outer covering A of the tire is cemented to the protective covering C, preferably by means of a rubber solution.

In order to prevent the threads $g$ or the leather layers $c\ c'$ from being cut by the sharp edges of the thin metal strip F when the tire is in use, each of the edges of the said metal strip may be provided with a covering or guard $f$ of brass or other suitable material, as shown in Fig. 5.

It will be obvious that my protective covering can be applied to any type of pneumatic tire, and that tires having my protective covering can be fitted to bicycle-wheels or to the wheels of any other vehicle. The width of the protective covering and of the metal strip F may be varied, as required.

What I claim is—

1. A protective covering for the inner or air tubes of pneumatic tires, consisting of a leather strip the lateral portions or edges $c'$ of which are bent back upon the central portion $c$ and are connected together by their beveled or chamfered edges $c^2$, of steel wires E for securing the tire to the rim of a wheel the said wires being inserted in the edges of the folded strip of leather and of a central metal strip F consisting of a thin sheet-steel strip placed between the two leather layers $c\ c'$ of the folded strip of leather, the said metal strip F and the steel wires E being secured in position by threads $g\ g'$ and the two leather layers being cemented to the metal strip and to one another, substantially as described and illustrated.

2. A protective covering for the inner or air tubes of pneumatic tires, consisting of a leather strip the lateral portions or edges $c'$ of which are bent back upon the central portion $c$ and are connected together by their beveled or chamfered edges $c^2$, of steel wires E for securing the tire to the rim of a wheel the said wires being inserted in the edges of the folded strip of leather and of a central metal strip F consisting of a thin sheet-steel strip placed between the two leather layers $c\ c'$ of the folded strip of leather, the said metal strip F and the steel wires E being secured in pothe thread being thus disposed so that it is out of the way of the bobbin and does not come in contact with the hand that grasps the bobbin in the operation of doffing.

In Fig. 2 I show the shaft c provided with an operating lever or handle 19, having a tooth 20, which engages a notch in a block 21, which is fitted to slide upon the shaft c and is pressed by a spring 22 against the tooth 20. Said block has an ear or lug 23, which is engaged with the roller-beam and prevents the block from turning. The block may have two recesses adapted to engage the tooth 20, one recess being arranged to receive the tooth when the shaft c is in position to raise the thread-guides and the other when the shaft is turned to depress the thread-guides.

In Figs. 3, 4, and 5 I show an arm 28, pivoted at 27 to a support on the roller-beam and provided with a notch or recess 29, which engages a pin 30 on the arm 14, the latter being affixed to the shaft c, as in the construction previously described. When the notch 29 is engaged with the pin 30, the shaft is held in position to operatively support the thread-guides. The arm 28 is provided with a projection 33, arranged to engage the pin 30 and hold the thread-guides in their displaced position. Said arm 28 may also be provided with a recess 34 near its outer end adapted to engage the pin 30 and support the shaft with the thread-guides raised above their operative position. In either construction the shaft c has an arm 14 affixed to it and an adjustable intermediate connection between said arm and the roller-beam, whereby the shaft may be held in different positions.

It will be observed that the sheet-metal arms b', bent from a single piece of sheet metal, constitute a very durable and economical substitute for the wooden blocks which are usually employed to support the thread-guides. It will also be seen that I substitute for the usual wooden thread-board the metal shaft c, which is not liable to lose its proper shape, whereas the ordinary wooden thread-board is liable to warp and thus cause permanent displacement of the thread-guides.

I have shown the arms b' provided with a bent-wire arm a', clamped between the ears 2 2 below the guide b, said arm being arranged to catch any knots or kinks that may appear on the thread. Heretofore one end of the thread-guide has been extended downwardly from the loop or eye portion to constitute a knot-catcher; but by making the knot-catcher in a separate piece, as here shown, I secure an important advantage in that I am enabled to adjust the knot-catcher with reference to the thread-guide, such adjustment being often very desirable.

I claim—

1. In a spinning-frame, a shaft journaled in bearings on the roller-beam, a series of thread-guide-carrying arms mounted on said shaft, means carried by said shaft for controlling the position of the shaft and arms on the axis of the shaft, and a yielding or movable locking connection between the said means and the roller-beam whereby the shaft and arms are automatically locked in raised or lowered position.

2. A thread-guide-carrying arm composed of a piece of sheet metal bent to form a shaft-embracing socket, and a bifurcated arm provided with means for compressing the sides thereof upon the thread-guide.

3. A thread-guide-carrying arm composed of a single piece of sheet metal having the clamping-ears 2 2 and the shaft-embracing socket 4 having a slot 5, said ears having holes to receive a clamping-bolt.

4. In a spinning-frame, a shaft journaled in bearings on the roller-beam, a series of thread-guide-carrying arms mounted on said shaft, an arm 14 affixed to said shaft, a weighted lever pivoted to a fixed support, and a link 15 connecting said lever with the link 14, said lever, link, and arm being arranged so that the lever when in one position presses the thread-guides upwardly, and when in another position presses the thread-guides downwardly.

5. In a spinning-frame, a shaft journaled in bearings on the roller-beam, a series of thread-guide-carrying arms mounted on said shaft, an arm such as 14 affixed to said shaft, and a yielding supporting connection between the arm 14 and the roller-beam, whereby said arm, shaft, and thread-guides may be held in different positions.

In testimony whereof I have signed my name to this specification, in the presence of two subscribing witnesses, this 29th day of June, A. D. 1895.

EDWARD WHITTUM.

Witnesses:
C. F. BROWN,
WILLIAM QUINBY.